United States Patent [19]

Faria

[11] Patent Number: 4,862,995
[45] Date of Patent: Sep. 5, 1989

[54] OIL DISCHARGE DIFFUSER

[76] Inventor: Steve Faria, 13897 Road 144, Tipton, Calif. 93272

[21] Appl. No.: 58,165

[22] Filed: Jun. 4, 1987

[51] Int. Cl.$^4$ .......................................... F01M 11/03
[52] U.S. Cl. .................................. 184/6.23; 251/127; 417/310
[58] Field of Search ............... 184/6.23; 417/310, 307, 417/308, 309, 311; 415/121 G; 251/127; 123/196 R

[56] References Cited

U.S. PATENT DOCUMENTS 3,814,122 6/1974 Akaike ........................... 417/307 X
4,335,744 6/1982 Bey ................................ 251/127 X
4,456,033 6/1984 Kay et al. ....................... 251/127 X Primary Examiner—Leonard E. Smith
Attorney, Agent, or Firm—Dennis B. Haase

[57] ABSTRACT

In a lubricating pump for an internal combustion engine, or the like, wherein discharge pressure is regulated by diverting a portion of the discharge through a separate orifice back to the sump, means defining a diffuser disposed over the separate orifice having a plurality of openings therein in order to break up and diffuse the flow through said orfice to thereby prevent foaming of the lubricating discharge to the sump.

3 Claims, 1 Drawing Sheet

U.S. Patent  Sep. 5, 1989  4,862,995
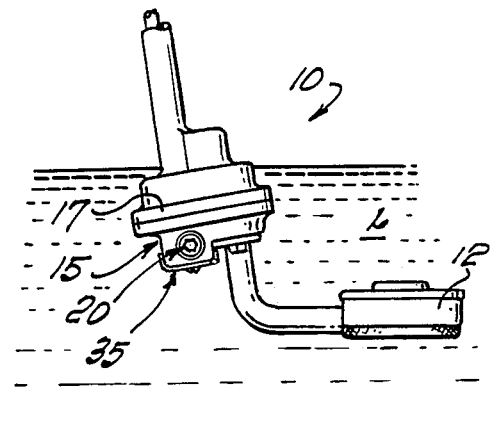
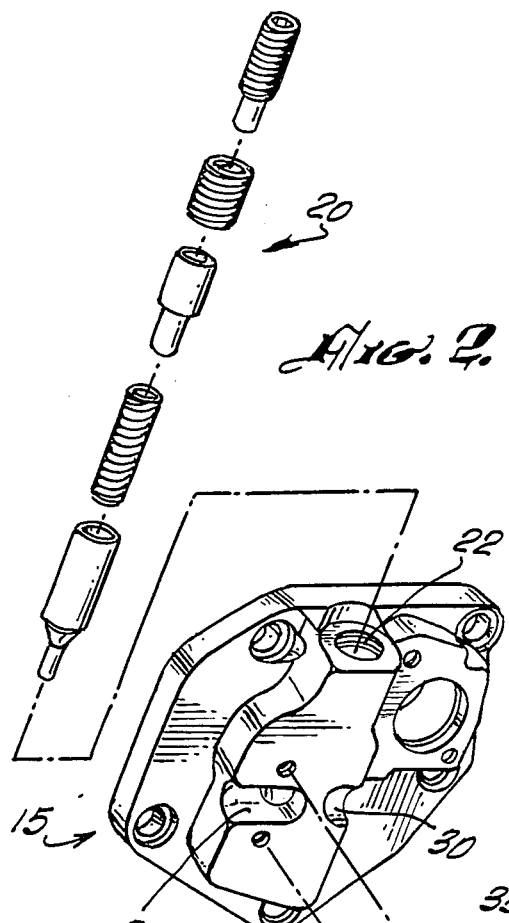
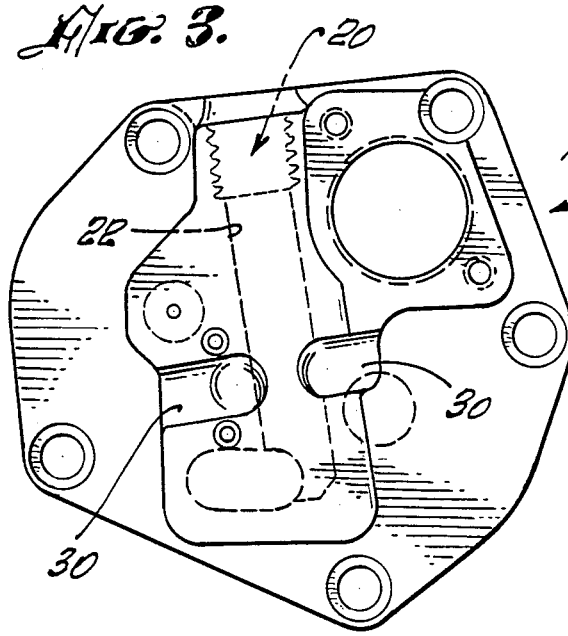
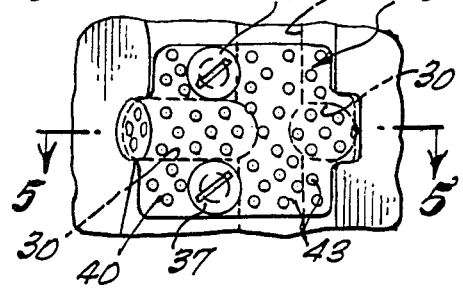
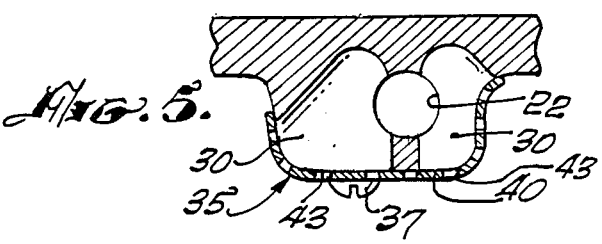

OIL DISCHARGE DIFFUSER

The present invention relates, in a general sense, to pumps for distributing lubricants under pressure throughout the interior working parts of an internal combustion engine. In particular, however, it relates to pumps of the type described wherein discharge pressure at the pump is regulated by diverting a portion of the volumetric flow back to the lubricant within the sump in such a manner as to avoid foaming and other adverse consequences normally suffered by such devices.

BACKGROUND OF THE INVENTION

At least since the advent of overhead valve engines, emission type oil pumps have been employed to draw lubricant from the crankcase sump and distribute it under pressure to various of the internal engine parts. In some instances, the splash system is used wherein oil sprayed on a rotating crank and camshaft is squeezed up through oil galleys and push rods to the top of the engine where they lubricate rocker arms and valves and trickle back down into the sump. In other instances, oil is distributed directly to vital parts, but in either event, the oil pump may generate more than 80 PSI for distribution of the lubricant throughout the engine.

A typical arrangement includes a gear pump enclosed in a casing which is either immersed in the crankcase sump, or has an intake screen immersed in the sump for drawing oil into the pump where it is squeezed between rotating gears typically driven by the distributor shaft and discharged upwardly under pressure to lubricate the engine parts.

In some engine applications, particularly in high performance engines of the wet-sump variety, regulation of the discharge pressure is a highly desirable feature. Several such devices for regulating discharge pressure from the pump have been employed in the past and the typical method of accomplishing pressure regulation is to divert a portion of the discharge flow back to the crankcase sump, thereby modulating engine discharge pressure at a desired level.

FIELD OF THE INVENTION

In high performance applications, such as just discussed, discharge of fluid from the pressure regulator tends to cause foaming, as well as other detrimental consequences, in the crankcase sump. Any such changes in the homogeneity of the lubricant in the sump, or any breakdown in its consistency may have an adverse effect on the specific gravity of the oil drawn through the intake screen into the chamber. Cavitation may result, or a consequent uncontrolled drop in pressure could occur, all of which might result in damage to the engine.

OVERVIEW OF RELATED PRIOR ART

Possibly because of the nonuniversal nature of the problem, which tends to be indigenous to high performance applications, the typical solutions to the problem addressed here is to employ a lubricant commonly referred to as dry sump system. A dry sump system is basically a separate and distinct lubricating system, commonly belt driven, which, by virtue of its structure, does not suffer from the same disability as the wet sump system encounters under high performance conditions. Since dry sump systems, however, are uncommonly expensive relative to systems contemplated by the present invention, it is an objective of the present invention to render the more common wet sump system usable under high performance conditions by ameliorating the drawbacks herein referenced.

SUMMARY OF THE PRESENT INVENTION

The present invention, once disclosed, appears to be simple enough in concept, yet it appears to be hitherto unknown, or, at least, unrecognized, by auto enthusiasts as a solution to the debilitating problems arising out of the foaming of the discharge from the pressure regulator back into the oil sump.

Reduced to its simplest form, the invention contemplates a diffuser at the discharge orifice from the pressure regulator, which results in some increase in static pressure behind the screen while, at the same time, breaking up the discharge flow into a diffused number of streams discharging into the sump in a variety of different directions, the bottom line being that there is no foaming in the oil or break down in the homogeneity, or continuity, of the oil which might adversely effect the oil drawn into the intake.

THE DRAWINGS

Having now summarized the invention within the context of its environment and contemplated use, the present invention will, in its preferred embodiment, be described in detail in conjunction with the drawings, wherein:

FIG. 1 is a pictorial view of a mechanical oil pump having a pressure regulator disposed in a typical environment;

FIG. 2 is an exploded perspective of the regulator housing, which also serves as the base of the pump casing;

FIG. 3 is a top view of the housing of FIG. 1;

FIG. 4 is an enlarged partial section of the discharge port for the regulator with the diffuser member of the present invention in place;

FIG. 5 is a partial section along lines 5—5 of FIG. 3.

DESCRIPTION OF THE PREFERRED EMBODIMENT

With reference now to the drawings, and initially to FIG. 1, an oil pump 10 is illustrated, immersed in lubricant L contained in the sump crankcase, not illustrated. When the pump is driven, oil is drawn into the pump through screen 12 and is discharged, under pressure, in an upward direction so as to provide lubricant to the moving parts of the engine.

With specific reference to FIG. 2, a block 15 is illustrated in some detail. The block 15 forms a portion of the pump housing when it is bolted against the cap 17 of the pump 10. A pump chamber, not specifically illustrated, is formed in the cap and, in the particular pump illustrated, rotating gears within the chamber generate the necessary fluid pressure.

The pump 10 is of the type which permits regulation of pump pressure, the particular construction of which is illustrated generally in FIG. 2 at 20. In the present instance, the regulator is adjustable from a point external to the pump itself to regulate pressure, although regulators having other adjustment means would create also the types of problems which the present invention is capable of alleviating.

In any event, the regulator 20 is accommodated in a bore 22 within the block 15, and as may be seen, the regulator uses an adjustable spring rate to position a sliding valve mechanism. When pressure generated by the pump exceeds the pre-set spring pressure, the sliding valve responds by moving within the bore 22. As a result, fluid under pressure at the discharge side of the pump is exposed through regulator port 30 to the lubricant L in the sump, which is at atmospheric pressure. As a result, fluid discharged from the pump to lubricate engine parts is discharged at a predetermined pressure which is adjustable to accommodate engine operating conditions.

Fluid discharged from the regulator discharge port 30 is typically discharged at pressures slightly less than generated within the pump and, in pumps currently in use that discharge from the regulator results in significant foaming of the lubricant in the pump, which adversely effects the homogeneity and specific gravity of the oil being drawn through the intake 12. The likely result of such foaming is a resultant inefficiency at the intake, and possible cavitation, all of which would have a detrimental effect on the lubrication of the engine parts which rely on the pump.

The present invention resolves the problems inherent in discharging fluid under pressure directly into the sump, and this is accomplished by the use of means for diffusing fluid discharge. Thus, a diffuser 35 is constructed to completely cover the discharge port 30 in tight sealing engagement where it is held in place by machine screws 37, as illustrated. The diffuser comprises a plate 40 in which a plurality of holes 43 are formed in a random pattern, although it is preferred that the holes be on centers which are equidistant from one another, and of such distance as to have sufficient plate material between them so as to permit the plate to retain adequate strength to avoid buckling, or distortion, under fluid pressure. The holes just also be of sufficient size to allow the passage of lubricants of higher, as well as lower, viscosities, while providing the requisite diffusion characteristics. It has been found that in typical installations, holes of 2 to 3 millimeters, spaced at 1 to 2 millimeters distances, is very efficient.

With the diffuser 35 in place, oil from the discharge port is broken up and diffused as it passes through the holes 43 into a plurality of low pressure streams which eliminate foaming and other dilatorious effects otherwise experienced.

Having thus described the preferred embodiment of my invention, what is claimed is:

1. In an immersion type mechanical oil pump for discharging lubricant under pressure to moving parts of an internal combustion engine, the combination of:
   a pump housing having a pump chamber therein for generating fluid pressure;
   an intake passage in said pump housing for drawing lubricant, from a lubricant sump within which the pump is immersed in use, into said pump chamber;
   pressure regulator means, in communication with a discharge side of said pump chamber for regulating pressure by diverting lubricant therefrom;
   discharge passage means formed in said housing in communication with a discharge side of said pressure regulator means for expelling diverted lubricant from said pump housing to the lubricant sump; and
   means for preventing foaming of the diverted lubricant in the lubricant sump by breaking up the diverted lubricant as it exits an outlet orifice of said discharge passage means, said means for preventing comprising a single plate that is formed with a series of small holes and is secured across said outlet orifice.

2. The device as set forth in claim 1, wherein,
   said holes are equidistant and the space between them such that said plate will not buckle or distort under fluid pressure.

3. The device as set forth in claim 2, wherein,
   said holes are of equal diameter, which diameter ranges between 2 and 3 millimeters, and each hole is spaced from an adjacent hole by a distance of 1 to 2 millimeters.

* * * * *